May 17, 1932.　　　L. D. SOUBIER　　　1,859,114
MEANS FOR MAKING BLOWN GLASS ARTICLES
Original Filed Sept. 20, 1924　　4 Sheets-Sheet 3
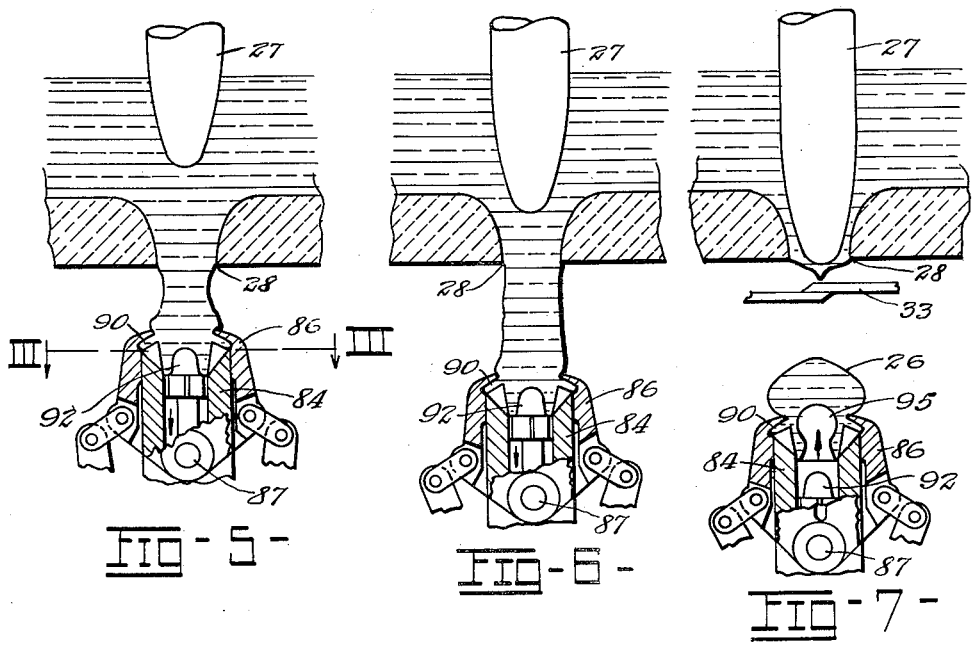
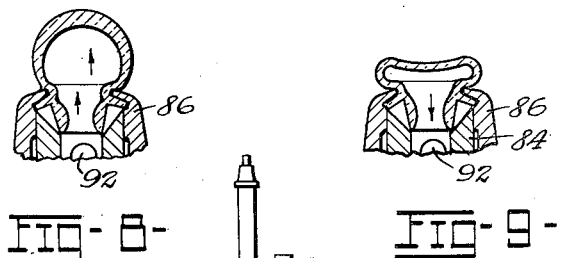
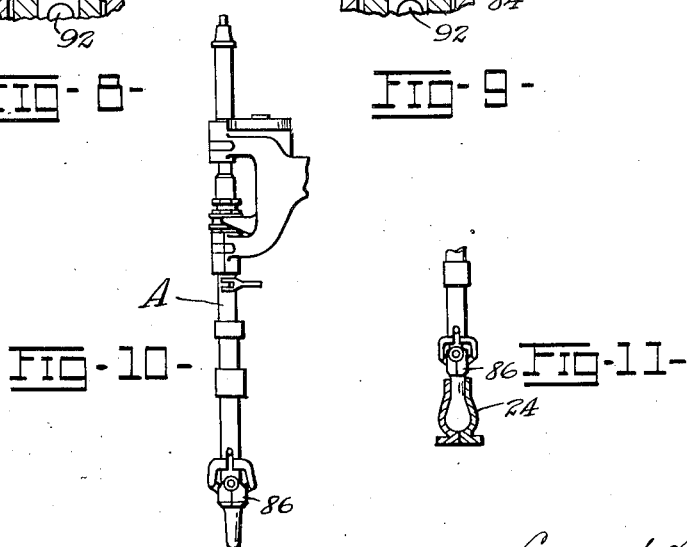
Leonard D. Soubier
Inventor,
By J. F. Rule, Attorney May 17, 1932. L. D. SOUBIER 1,859,114
MEANS FOR MAKING BLOWN GLASS ARTICLES
Original Filed Sept. 20, 1924 4 Sheets-Sheet 4
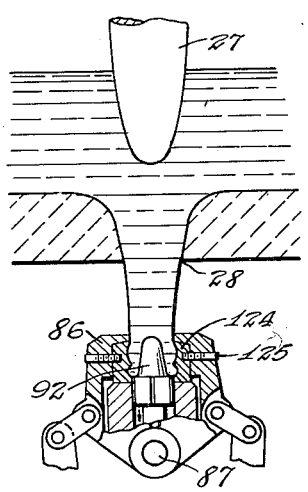
Fig-12-
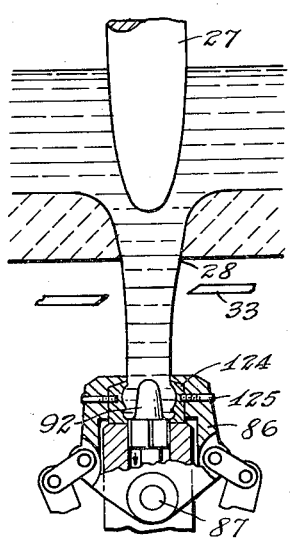
Fig-13-
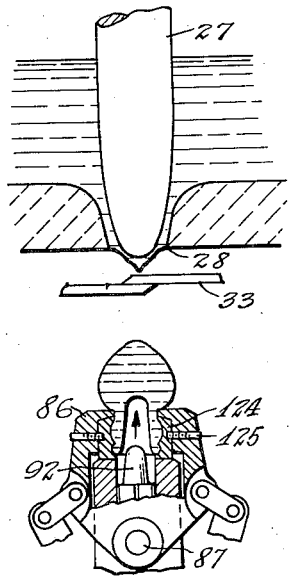
Fig-14-
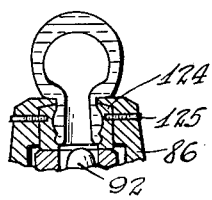
Fig-15-
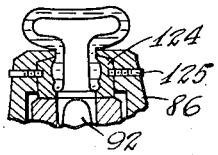
Fig-16-
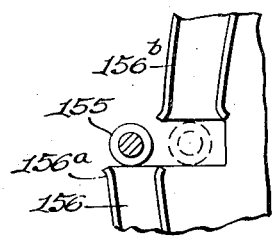
Fig-18-
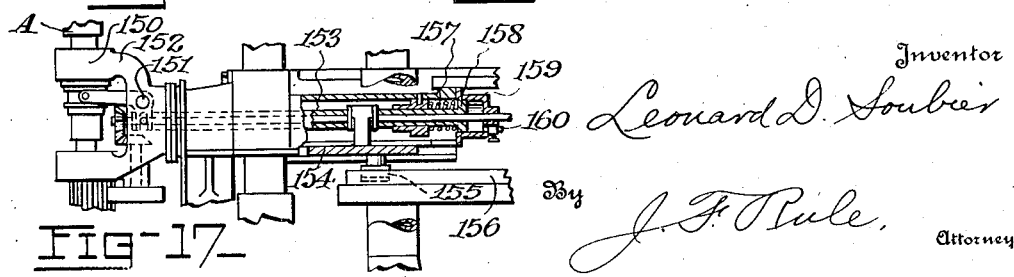
Fig-17-
Inventor
Leonard D. Soubier
By J. F. Rule,
Attorney Patented May 17, 1932

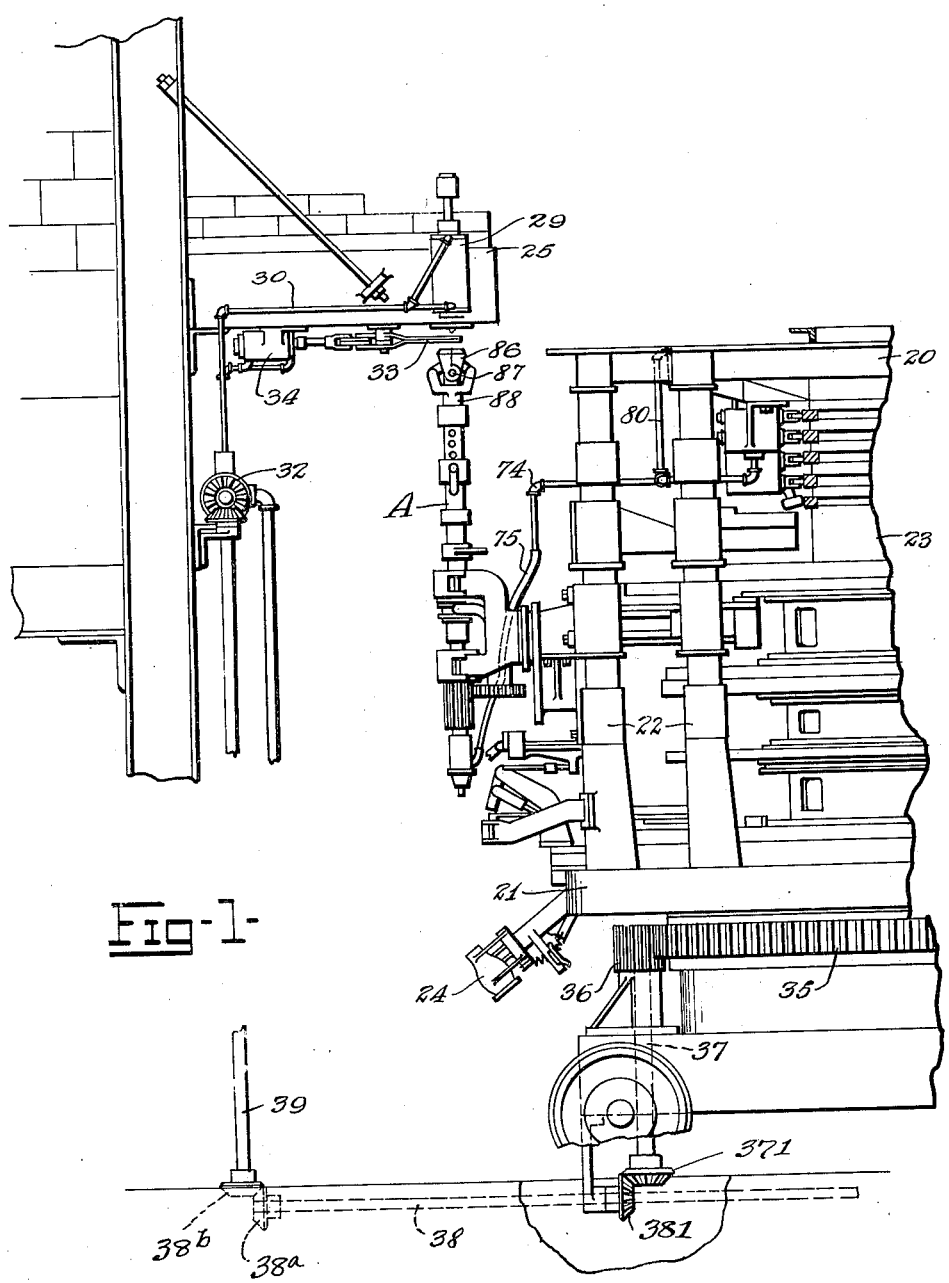

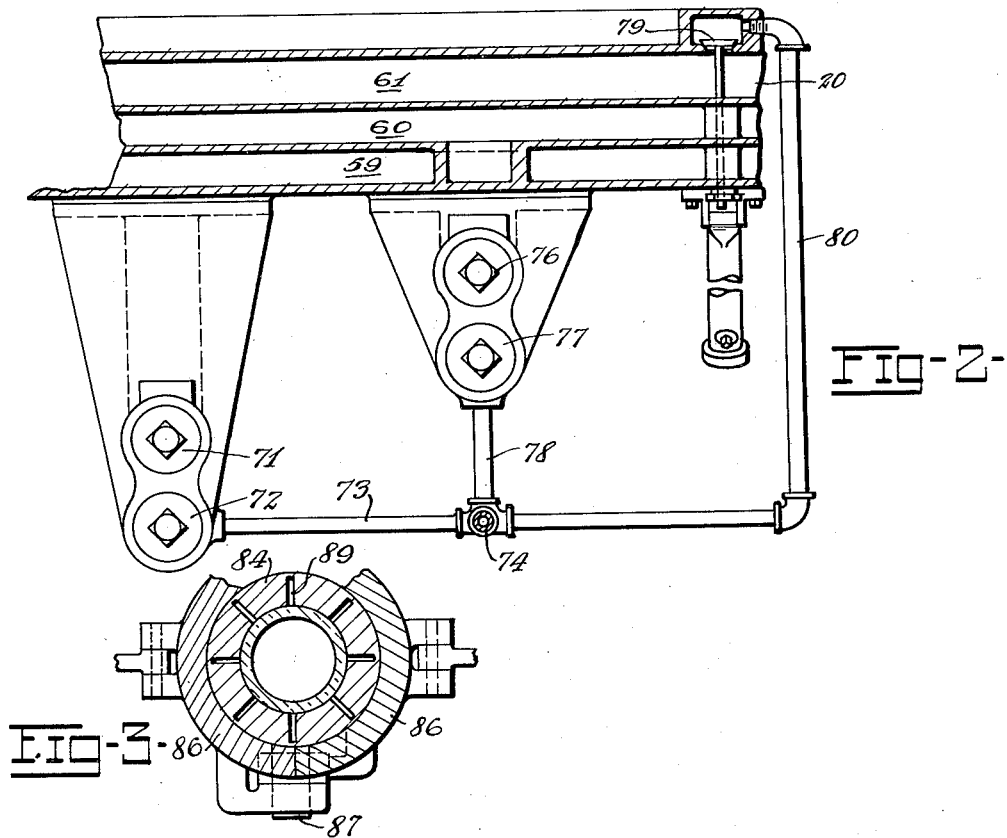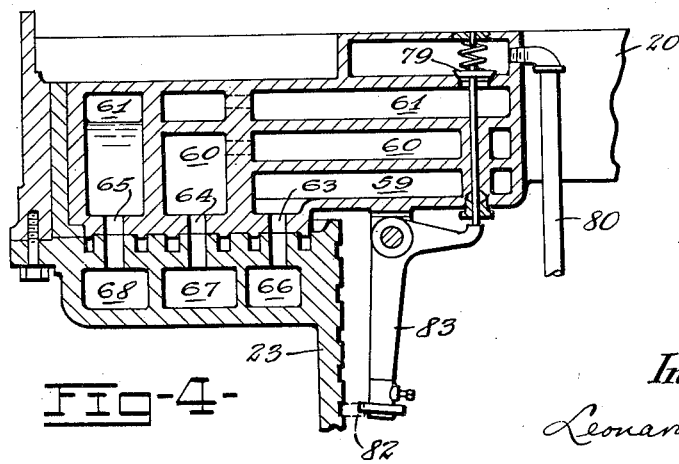

1,859,114

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

MEANS FOR MAKING BLOWN GLASS ARTICLES

Original application filed September 20, 1924, Serial No. 738,761. Divided and this application filed October 27, 1928. Serial No. 315,472.

My invention relates to a method and apparatus for making electric lamp bulbs, bottles and other hollow glass articles. One form of the invention relates particularly to machines for making blown glassware in which thin walls are a requisite or where a paste mold finish is desired.

In the manufacture of hollow glass articles which are formed in molds, there are in extensive use at present, two general methods of separating the individual masses or charges of glass from the supply body and introducing them into the molds. One of these is the suction method, typified in the Owens machine, in which the mold is brought into contact with the supply body and the charge of glass drawn into the mold by suction and then severed from the supply body. In the other method, the molten glass is caused to issue by gravity from an outlet, the issuing glass being periodically severed to form the individual charges or masses which are introduced after such severance, into the molds.

In the manufacture by either of these methods, of bottles or other hollow articles, the charge of glass is formed into a parison in a combined neck mold and body blank mold, after which the body blank mold is opened or removed, leaving the parison supported in the neck mold. A finishing mold then encloses the parison and the latter is blown to its final form.

An object of the present invention is to provide a novel method of forming the glass article in which the usual body blank mold is dispensed with, the charge of glass being supported in the neck mold in which the neck portion of the article is formed while the body portion is given a preliminary formation in the open, after which it is introduced into the finishing mold and given its final shape.

A feature of the invention comprises the formation of articles by a method in which the glass is permitted to issue from an outlet orifice in the form of a descending stream or column, the lower end of which, when it reaches a predetermined position, is engaged by a suitable supporting implement which then moves downward with the issuing glass until a sufficient quantity has been extruded, the glass being then severed below the outlet. The severed mass or charge of glass, while thus attached to its support, is given a preliminary hollow formation by a series of blowing operations, after which it is introduced into a finishing mold and blown to its final shape. In one form of the invention, the support comprises a neck ring for forming the neck of the article.

Other objects of the invention will appear hereinafter.

The present application is a division of my copending application Serial Number 738,761, filed September 20, 1924, Method and means for making blown glass articles, on which application Patent Number 1,778,735 was granted October 21, 1930.

The invention is herein shown in connection with a blowing machine which may be considered a modification of the bulb making machine disclosed in the United States Patents to Kadow, Number 1,248,664, December 4, 1917, and Number 1,527,556, February 24, 1925, to which reference may be had for a fuller disclosure of various details of construction and operation.

In the accompanying drawings:

Fig. 1 is an elevation view, with parts broken away, showing a glass blowing machine and glass feeding mechanism constructed in accordance with the present invention.

Fig. 2 is a fragmentary view showing the chambers for vacuum, low pressure and high pressure.

Fig. 3 is a sectional view of the spindle, the section being taken at the line III—III on Fig. 5.

Fig. 4 is a fragmentary sectional view showing the air and vacuum distributing head and the air and vacuum chambers.

Figs. 5 to 9 are sectional views showing the upper portion of the spindle and illustrating successive steps in the method of segregating a charge of glass from the supply body and giving it a preliminary formation before introducing it into the finishing mold. Fig. 5 shows the issuing glass gripped by the jaws on the spindle. Fig. 6 shows the spindle moved downward to an intermediate position before the charge is severed. Fig. 7 shows the charge or blank severed, the spindle moved farther down, the plunger withdrawn, and the blank partially expanded by the initial blowing operation. Fig. 8 shows a further expansion of the blank. Fig. 9 shows the blank collapsed by applying suction therein.

Fig. 10 is a view of the spindle in its inverted position.

Fig. 11 is a detail showing a blank in the finishing mold.

Figs. 12 to 16 illustrate a different form of the invention in which a neck forming thimble or neck mold is mounted on the spindle, thus adapting the invention for use in the formation of a bottle or other hollow article in which the neck end portion is finished in the mold. These figures illustrate successive steps in the preliminary formation of the parison, and correspond respectively to Figs. 5 to 9, inclusive.

Fig. 17 is a part sectional fragmentary view showing mechanism for operating the spindle.

Fig. 18 is a fragmentary view of a cam for controlling certain movements of the spindle.

The machine herein shown includes a plurality of glass forming units arranged upon a carriage or framework comprising an upper spider 20, a lower spider 21 and connecting columns 22. The carriage is rotated about a stationary drum 23. Each unit comprises a spindle A which is designed to receive a charge or gob of glass, means for supplying suction through the spindle for attaching the glass to the spindle and effecting various operations on the blank or charge of glass, means for forcing air under pressure through the spindle into the blank, a mold 24 in which the article is given its finished form, and valves and other mechanisms controlled by cams on the stationary drum for operating the spindle and effecting the operations on the glass required for the production of the finished articles.

As the machine rotates, the spindles A are brought in succession to a charge receiving position beneath a feeder from which the glass is supplied to the spindles. The feeder may be of any approved construction and as herein shown includes a regulating plunger 27 which is periodically reciprocated vertically over an outlet opening 28 in the forehearth or boot 25 of the furnace tank. The plunger 27 is actuated by an air motor 29 having pipe connections 30 with a timer 32. The glass is periodically severed by a pair of shears 33 operated by an air motor 34 also connected to the timer. The drive shaft 38 has operating connections with the machine carriage through gearing comprising intermeshing mutilated bevel gears 381 and 371 mounted respectively on the drive shaft 38 and a vertical shaft 37 which carries a pinion 36 running in mesh with a ring gear 35 on the carriage. The drive shaft 38 rotates continuously, and by means of the mutilated gears 381, 371 imparts an intermittent rotation to the mold carriage, the shaft 37 being given one complete rotation during each rotation of the drive shaft and then brought to rest for a brief interval while a spindle is directly beneath the feeder outlet and receiving its charge, as hereinafter set forth.

Referring to Figs. 2 and 4, a high pressure air chamber 59 is formed in the upper member 20 (Fig. 1) of the mold carriage. A low pressure chamber 60 and a vacuum chamber 61 are also formed in the frame member 20. The chambers 59, 60 and 61 are in constant communication through ports 63, 64 and 65, respectively, with a high pressure chamber 66, a low pressure chamber 67 and a vacuum chamber 68, the last three mentioned chambers being formed in the stationary drum 23.

The construction and arrangement of the air and vacuum chambers mentioned in the preceding paragraph, the pipe connections therefrom to the spindles A, and the valves controlling the air supply to the spindles, may be similar to the corresponding parts in the United States patent to Kadow, Number 1,195,588, August 22, 1916. Valves 71 and 72 (Fig. 2) control the supply of air from the high pressure chamber 59 through pipes 73 and 74 and a flexible hose 75 (Fig. 1), to the spindle. Valves 76 and 77 control the supply of air from the low pressure chamber 60 through pipe line 78, 74, 75, to the spindle. The valve 79 when opened establishes communication from the vacuum chamber 61 through pipe line 80, 74, 75 to the spindle. The valve 79 is actuated (see Fig. 4) by a stationary cam 82 operating through a bell crank lever 83.

The construction and operation of the spindles A are in the main like those fully set forth in the Kadow Patent Number 1,248,664 hereinbefore mentioned. In the present invention, however, the upper or glass receiving end of the spindle is specially designed for holding and shaping the glass, and a novel means and method are employed for attaching a charge of glass to the spindle and giving an initial formation thereto.

The spindle is provided at its upper end with a holder 84 (Figs. 3 and 5) which is mounted for a limited vertical movement in the end of the spindle casing. A pair of jaws 86 are pivoted at 87 and are operated by a sleeve 88 slidable lengthwise of the spindle. As the carriage rotates, the spindles are brought in succession to a position directly beneath the feeder outlet 28, as shown in Figs. 1 and 5. When a spindle is brought to this position the rotation of the carriage is arrested as hereinbefore explained, to permit the spindle to receive its charge. While the spindle is in this position, the stream or column of glass issuing from the feeder outlet 28 moves downward into engagement with the holder 84. The jaws 86 which are preferably open when the glass engages the holder 84, are then swung to the Fig. 5 position to grip the glass. The air is now exhausted through the spindle and serves to firmly attach the glass to the spindle. Radial slots 89 (Fig. 3) permit the air to be exhausted from the annular space provided by the end of the holder and the jaws 86, so that the glass enters said space and forms an annular flanged portion 90 on the blank of glass. A plunger tip 92 which at this time is in its raised position (Fig. 5) forms an initial blow opening in the glass.

As soon as the glass has been attached to the spindle, the latter is moved downward by the following described mechanism. A bell crank lever 150 (Figs. 1 and 17) is pivoted at 151 on the bracket 152 which supports the spindle. The bell crank comprises a forwardly extending arm which is operatively connected to the spindle for moving the latter up and down when the bell crank rocks on its pivot. The other arm of the bell crank is connected to the outer end of a hollow shaft or rod 153 extending radially of the machine. Said shaft is connected to a slide plate 154 carrying a cam roll 155 which runs in a stationary cam 156.

The cam 156, as shown in Fig. 18, comprises sections 156$^a$ and 156$^b$, the ends of which are spaced apart in the direction of their length, the end of the cam section 156$^a$ also being positioned outwardly relative to the section 156$^b$ or at a greater distance from the center of the machine. These cam sections are so arranged that when the carriage is brought to rest with a spindle beneath the feeder outlet, the cam roll 155 has just cleared the end of the section 156$^a$ so that it is free to move radially inward independently of the cam. A coil spring 157 (Fig. 17) surrounding the hollow shaft 153, bears against a piston head 158 on said shaft and moves the shaft radially inward when the cam roll 155 cleares the cam section 156$^a$. The shaft 153 operating through the lever 150 moves the spindle downward from the position shown in Fig. 5 to that shown in Fig. 6. This downward movement of the spindle is retarded by a dash pot 159 in which the piston 158 moves, the rate of movement being adjustably regulated and controlled by an adjustable bleed valve 160 in the dash pot. During the downward movement of the spindle, the cam roll 155 is carried inward from the full line position, Fig. 18, to the dotted line position opposite the cam section 156$^b$ so that when the carriage resumes its travel the roll enters said cam section.

The downward movement of the spindle takes place as soon as the glass has been attached to the spindle, the issuing glass being drawn out as shown in Fig. 6. The plunger 27 is also moving downward at the same time and thereby assists in expelling the glass. The relative time and rate at which the plunger 27 and spindle are moved downward are so coordinated that the issuing glass will form a column of approximately uniform diameter throughout its length. The shears 33 operate during the downward movement of the spindle to sever the glass, as indicated in Fig. 7, leaving a segregated charge or mass of glass 26 attached to the spindle. During the downward movement of the spindle, the plunger tip is withdrawn and air pressure supplied to expand the glass. The incipient expansion of the glass is indicated at 95 (Fig. 7). The blowing is continued until the parison assumes the hollow form shown in Fig. 8, after which the air is exhausted to collapse the glass (Fig. 9). After the glass is thus collapsed, the spindle is swung downward toward a horizontal position and the parison again expanded. The spindle is finally swung downward to the vertical depending position (Fig. 10) and the finishing mold 24 (Fig. 11) closed around the parison which is given its final shape in the mold. The various operations by which the formation of the lamp bulb or other article is completed after the charge of glass has been attached to the spindle and severed from the supply body as shown in Fig. 7, may be the same as those set forth in the Kadow patents hereinbefore mentioned.

Figs. 12 to 16, inclusive, illustrate a form of the invention adapted for making bottles or other articles in which the neck portion is finished in the mold. For this purpose, the spindle A is provided at its upper end with a neck forming thimble 124 arranged to form a bottle neck on the end of the charge of glass. This thimble or neck ring may be substantially the same as in an ordinary bottle forming machine and comprises two separable halves, these halves being attached to the jaws 86 by screws 125. When the spindle is brought into position beneath the feeder outlet 28, the jaws 86 and neck ring 124 are preferably in their closed position and the plunger tip 92 raised as shown in Fig. 12. As the lower end of the descending column of glass engages the spindle, suction is applied, causing the glass to fill the neck ring and shape the neck of the article which is being formed. The spindle is then lowered, the plunger withdrawn, the shears 33 operated to sever the glass and the blowing operations performed, all substantially as above described in connection with Figs. 5 to 10, inclusive. While the spindle A is in its swung-down position with the parison supported in the neck mold and depending therefrom, the finishing mold 24 is closed around the parison and the latter blown to its finished form, after which the finishing mold and neck mold are opened to discharge the finished article.

Modifications may be resorted to within the spirit and scope of my invention.

What I claim is:

1. The combination of a container for molten glass having an outlet opening in the bottom thereof thru which the glass issues, a hollow receiver beneath the outlet positioned to engage the lower end of the issuing glass, means for moving the receiver downward after it has engaged the glass, means to then sever the glass between the outlet and said receiver, and means coperating with the receiver to impart a hollow form to the glass within the receiver.

2. The combination of a container for molten glass having an outlet opening thru which the glass issues, receiving devices brought successively to a receiving position beneath the outlet, each said device comprising means to engage and grip the lower end of the issuing glass, means to move the receiving device downward with the glass while the latter is connected to the supply body within the container, and means to sever the glass at a point between the outlet and the receiver.

3. The combination of a container for molten glass having an outlet opening thru which the glass issues, receiving devices brought successively to a receiving position beneath the outlet, each said device comprising means to engage and grip the lower end of the issuing glass, means to move the receiving device downward with the glass while the latter is connected to the supply body within the container, means operating periodically to sever the glass at a point beneath the outlet while the receiver is moving downward, and means within the container operating periodically in synchronism with the operations of the severing means to retard and control the issuance of the glass.

4. The combination of a container for molten glass having a bottom outlet thru which a column of glass issues downwardly, a holder, means for moving said holder to a position directly beneath the outlet and causing the lower end of said column to be engaged thereby, and means for moving said holder vertically downwardly with the issuing glass, means for severing the glass at an intermediate plane between the outlet and said holder, leaving a mass of bare glass supported by the holder and projecting upwardly therefrom, and means for expanding the glass to hollow form while in said position beneath the outlet.

5. The combination of a container for molten glass having a bottom outlet thru which a column of glass issues downwardly, a neck mold, means to position the neck mold beneath the outlet and cause the lower end of said column to enter the neck mold, means coöperating with the neck mold for shaping therein the neck of the article being formed, means for moving the neck mold and said neck downward while beneath the outlet, and means for severing the column of glass after said downward movement of the mold and thereby leaving a mass of glass projecting upward from the neck mold.

6. The combination of a container for molten glass having a bottom outlet thru which a column of glass issues downwardly, a neck mold, means to position the neck mold beneath the outlet and cause the lower end of said column to enter the neck mold, means coöperating with the neck mold for shaping therein the neck of the article being formed, a plunger projecting into the glass over the outlet, means for moving the neck mold downward with the downwardly issuing column of glass, and means to move the plunger downward as the neck mold moves downward and thereby control the rate at which the glass issues from the outlet.

7. The combination of a container for molten glass having a bottom outlet thru which a column of glass issues downwardly, a neck mold, means to position the neck mold beneath the outlet and cause the lower end of said column to enter the neck mold, means cooperating with the neck mold for shaping therein the neck of the article being formed, means for moving the neck mold downward, and means within the container for exerting an expelling force on the glass as the neck mold moves downward and thereby augmenting the rate at which the glass issues from the outlet.

8. The combination of a container for molten glass having a bottom outlet opening, an article forming machine comprising a mold carriage, neck molds thereon periodically brought in succession to a position directly beneath said opening, each neck mold adapted to receive the lower end of an issuing column of glass, means cooperating with the neck mold for shaping the glass therein to form the neck portion of the article being formed, means for moving each neck mold downward with the issuing glass, a plunger projecting into the glass over the outlet, means for periodically reciprocating the plunger in timed relation to the movements of the neck molds to control the rate at which the glass issues, means for severing the glass, and means for completing the formation of the article.

Signed at Toledo, Ohio, this 22 day of October, 1928.

LEONARD D. SOUBIER.